Nov. 30, 1937.        E. A. KLEB ET AL        2,100,764
DEODORIZER
Filed Nov. 30, 1936

Inventor
Earl A. Kleb
Joseph C. Metzger
By Rippey & Cassidy
Their Attorneys.

Patented Nov. 30, 1937

2,100,764

UNITED STATES PATENT OFFICE 2,100,764

DEODORIZER

Earl A. Kleb and Joseph C. Metzger, St. Louis, Mo.

Application November 30, 1936, Serial No. 113,360

1 Claim. (Cl. 183—34)

This invention relates to deodorizers, and has special reference to structures for use in removing objectionable odors from smoke, gases, vapors, etc., which are produced or emitted by or during manufacturing or processing operations in certain industries.

An object of the invention is to provide an apparatus for use in removing solids and condensates from smoke, gases, vapors, etc., and for destroying objectionable odors so that the resulting discharge is cleansed and purified and is unobjectionable.

Other objects of the invention are to provide an apparatus of the character named having means for withdrawing from a processing compartment or chamber smoke, gases, vapors, etc., together with entrained solids and condensates; to provide means for retaining the solids and other means for accumulating and discharging the condensates from the vapors, gases, etc.; and to provide a combustion device for destroying objectionable odors in the vapors, gases, etc., and for discharging the purified and unobjectionable remnants into atmosphere.

Other objects and advantages of the invention should be readily apparent from the following description, reference being made to the annexed drawing, in which—

Figure 1:
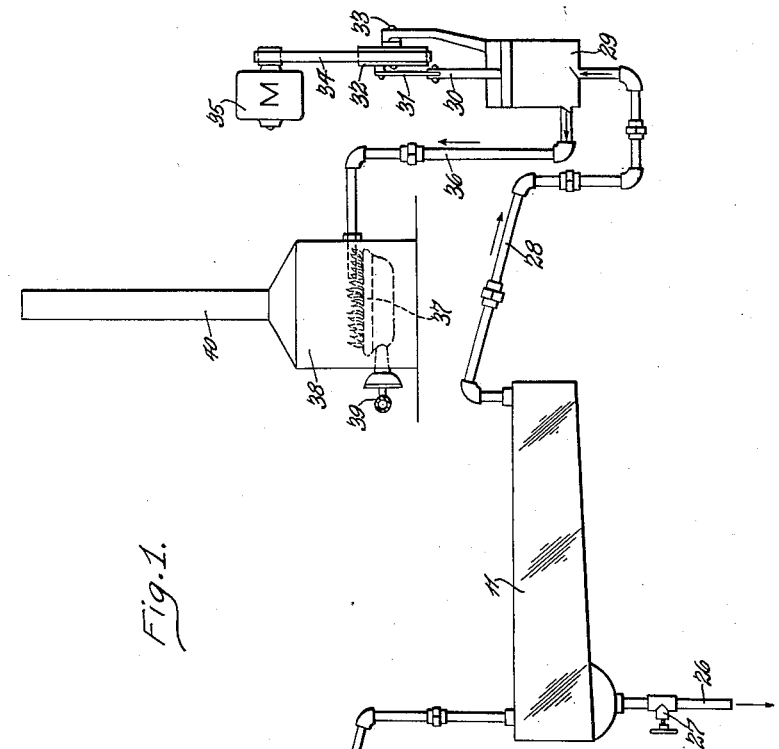
Fig. 1 is a side elevation with parts in section illustrating a preferred embodiment of our improved deodorizer.
Figure 2:
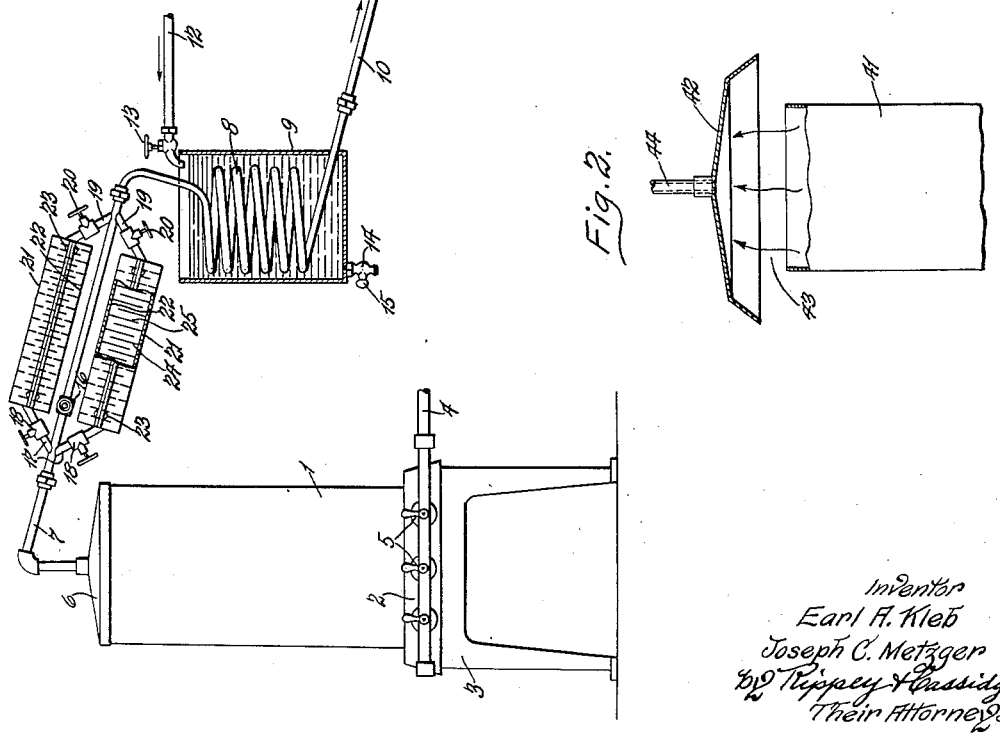
Fig. 2 is a sectional view showing a manufacturing or processing tank or receptacle provided with a spaced canopy instead of an attached lid for receiving and conducting into a withdrawal pipe smoke, gases, vapors, etc.

As shown in the annexed drawing, a manufacturing or processing receptacle or tank 1 is supported above a conventional burner device 2 by a supporting frame 3. Fuel is supplied to the burner device through a pipe 4 having valves 5 controlling the passage of the fuel to the conventional burners (not shown) above which the receptacle or tank 1 is supported.

The receptacle or tank 1 has attached thereto a lid 6 forming a closure for the upper end of the tank. A pipe 7 has one end opening into the tank through the center of the lid 6 and continues to form a cooling or condensing coil 8 within a water tank 9. The pipe 7 opens into the upper end of the coil 8, and the lower end of said coil is extended outwardly through the wall of the tank 9 to provide a pipe 10 having its end opening into a settling or recovery tank 11 which receives and retains the condensate discharged from the coil 8. A water supply pipe 12 equipped with a valve 13 conducts water into the tank 9, said valve being operative as usual to open and close the pipe 12. The lower end of the tank 9 is equipped with a discharge device 14 provided with a valve 15 for opening and closing the same.

The pipe 7 has a valve 16 in connection therewith and one or more bypass pipes 17 opening into the pipe 7 between the valve 16 and the receptacle or tank 1, and each provided with a control valve 18. The respective pipes 17 open into adjacent ends of separators, the opposite ends of which are connected by pipes 19 with the pipe 7 on the effluent side of the valve 16, and each being controlled by a valve 20. Each separator is composed of detachable units 21 and 22, the units of each separator being secured together by releasable fasteners 23 which hold the units together to provide hermetic chambers. The influent ends of said chambers open into the pipes 17, respectively, and the effluent ends of said chambers open into the respective pipes 19, the chambers in the pipes being detachably connected so that said chambers may be removed and replaced. The unit 21 of each chamber supports a number of baffles 24 and each unit 22 supports a number of baffles 25 alternating with the baffles 24 and cooperating therewith to form tortuous passages through the chambers, which will detach and separate most of the solids from the smoke, gases, vapors, etc. The valve 16 may be closed to cause all of the smoke, gases, vapors, etc. to pass through the separators, or may be left open, as desired; and the valves 18 and 20 may be kept closed or opened when the valve 16 is open, or may be kept closed, as desired.

The condensate resulting from the passage of the smoke, gases, vapors, etc. into and through the condensing coil 8 is conducted through the pipe 10 into the settling or recovery tank 11 and may be withdrawn therefrom through a discharge pipe 26 equipped with a valve 27 which may be opened and closed as desired. The pipe 10 terminates at the tank 11.

A pipe 28 has one end opening into the tank 11 and the opposite end opening into a pump 29 of conventional and known construction and having connections 30 and 31 with a crank wheel 32 rotative on a support 33 and operated by connections 34 driven by a motor 35. In the specific embodiment shown, the pump 29 is a suction pump, although it is obvious that any other type of pump may be used in any other location so long as it will cause or force the smoke, gases, vapors, etc. to pass from the receptacle or tank 1 into and through the pipe 7 and the remaining assembled members. From the pump 29, the smoke, gases, vapors, etc. are forced through a pipe 36 and discharged adjacent to a burner 37 confined within a furnace shell or the like 38 and to which fuel is supplied through known connections 39. The flames at the burner 37 will consume or destroy the objectionable odors carried by the smoke, etc. and the resulting purified remnants will be discharged through an outlet pipe 40.

Instead of having a lid 6 attached to the receptacle or tank 1, we may use a receptacle or tank 41 having its upper end open and separated from a canopy 42' by an intervening space 43. The smoke, gases, vapors, etc. rising from the tank 41 will be received or entrapped by the canopy 42 and conducted therefrom through a pipe 44 which is the same as the pipe 7 and continues through the same connections and devices as described above.

Other variations may be made within the scope of equivalent limits without departure from the nature and principle of the invention. The foregoing description of the device illustrated completely in Fig. 1 includes a description of the mode of use and operation of said device sufficient to enable any one skilled in the art to understand the same.

We claim:—

A deodorizer comprising a receptacle for substances being processed, a pipe opening into the upper end of said receptacle and having a portion extending upwardly therefrom and another portion inclining downwardly and laterally from said first named portion, a valve in said inclined pipe portion, a by-pass pipe opening into said inclined pipe portion at the influent side of said valve, another by-pass pipe opening into said inclined pipe portion beyond the effluent side of said valve, a valve in each of said by-pass pipes, a detachable separator forming communication between said two by-pass pipes, a condensing coil opening into said inclined pipe portion beyond said second by-pass pipe, a tank enclosing said condensing coil for containing water immersing said coil, a pipe opening into the effluent end of said condensing coil, a settling tank into which said last named pipe opens, a combustion device, mechanism for withdrawing obnoxious gases and vapors from said settling tank and conducting them to said combustion device, and means for withdrawing condensate from said settling tank.

EARL A. KLEB.
JOSEPH C. METZGER.